United States Patent [19]
Comollo

[11] 3,935,754
[45] Feb. 3, 1976

[54] FAILURE DETECTOR AND INDICATOR FOR AIRCRAFT FLAP ACTUATION SYSTEM

[75] Inventor: Virgilio Comollo, Bellevue, Wash.

[73] Assignees: The Boeing Company, Seattle, Wash.; Aeritalia S.p.A., Napoli, Italy

[22] Filed: June 14, 1974

[21] Appl. No.: 479,293

[52] U.S. Cl. ............ 74/665 F; 244/42 D; 64/30 E; 74/337; 74/388 R; 74/412 TA; 74/520; 74/664
[51] Int. Cl.² .................. F16H 37/06; F16H 5/52; F16H 35/00; B64C 9/00
[58] Field of Search .. 200/61.46, 80, 153 V, 153 G, 200/153 L, 153 LB; 64/30 R, 30 E, DIG. 2; 340/27 R; 244/76 A, 85, 89, 42 D; 74/417, 422, 426, 427, 664, 665 F, 665 GC, DIG. 7, 665 GB, 661, 665 P, 665 Q, 337, 385, 387, 810, 388 R, 520, 412 TA, 405; 192/150

[56] References Cited
UNITED STATES PATENTS

| | | | |
|---|---|---|---|
| 1,964,418 | 6/1934 | Alfaro | 244/42 D |
| 2,127,864 | 8/1938 | Girard | 244/42 D X |
| 2,517,680 | 8/1950 | Knowler et al. | 74/388 R X |
| 2,619,304 | 11/1952 | Feeney et al. | 244/85 |
| 2,695,145 | 11/1954 | Lear et al. | 74/388 R X |
| 2,809,736 | 10/1957 | Hoover | 244/42 D X |
| 2,834,010 | 5/1958 | Sieradzki | 200/61.46 X |
| 2,859,004 | 11/1958 | Lopiccolo | 244/42 D |
| 3,169,178 | 2/1965 | Notchev et al. | 200/61.46 |
| 3,703,833 | 11/1972 | Olah | 74/422 X |
| 3,830,349 | 8/1974 | Williams | 74/661 X |

*Primary Examiner*—Samuel Scott
*Assistant Examiner*—Lance W. Chandler
*Attorney, Agent, or Firm*—Christensen, O'Connor, Garrison & Havelka

[57] ABSTRACT

Detecting and indicating the failure of the primary drive train of a flap actuator system that includes primary and secondary drive trains driven by a common power supply is disclosed. When the primary drive trains fails, a free motion zone formed between the common power supply and the secondary drive train is crossed. Crossing of the free motion zone causes the position of an electro-mechanical sensor (or sensors) to change. The change in position of the electro-mechanical sensor(s) creates or changes the value of an electrical signal or signals to provide an indication of the failure of the primary drive train.

29 Claims, 16 Drawing Figures

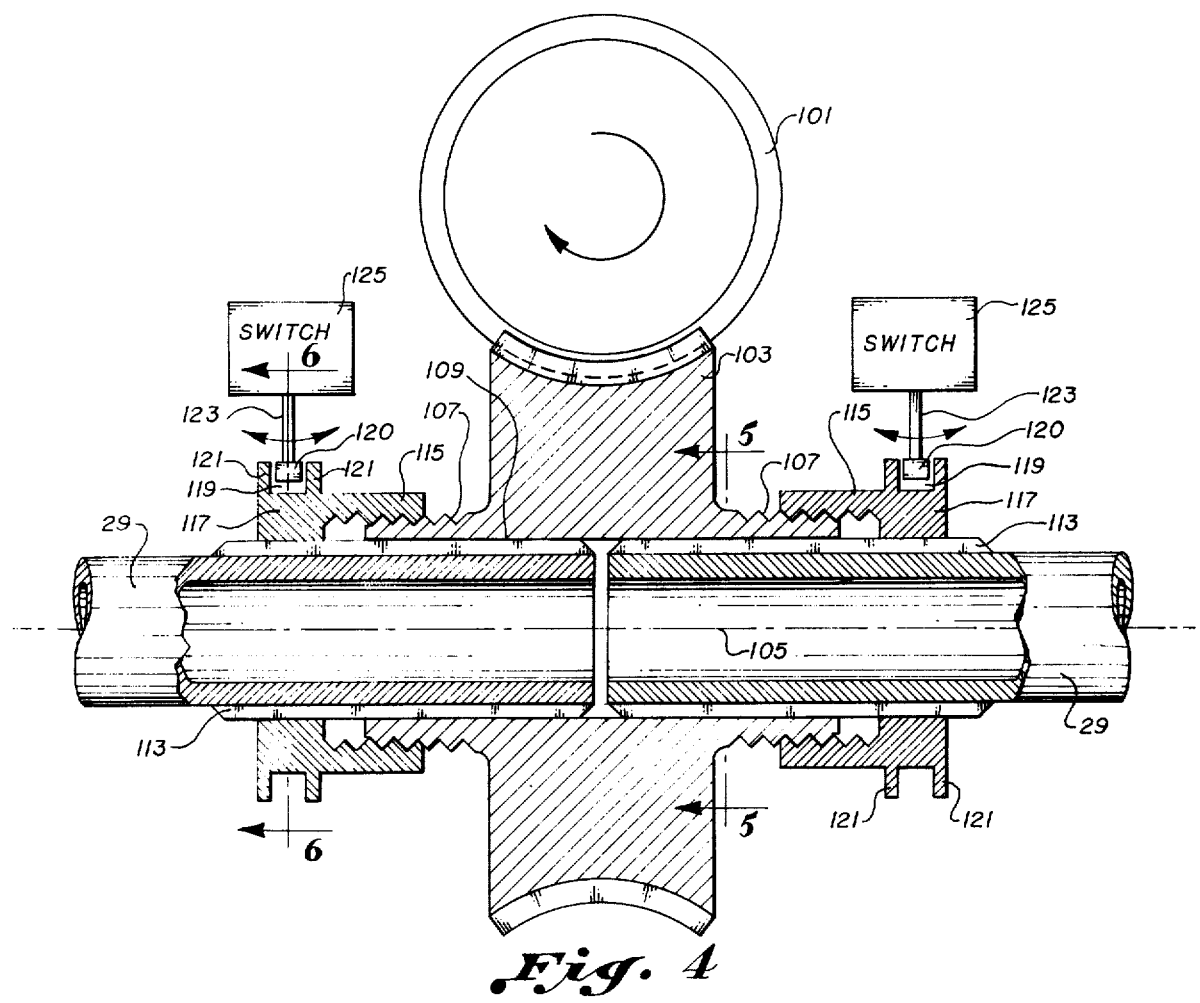
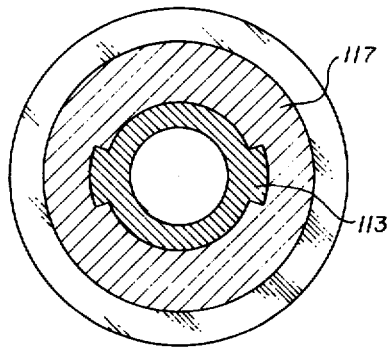
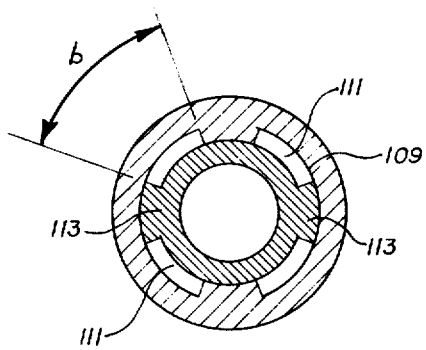

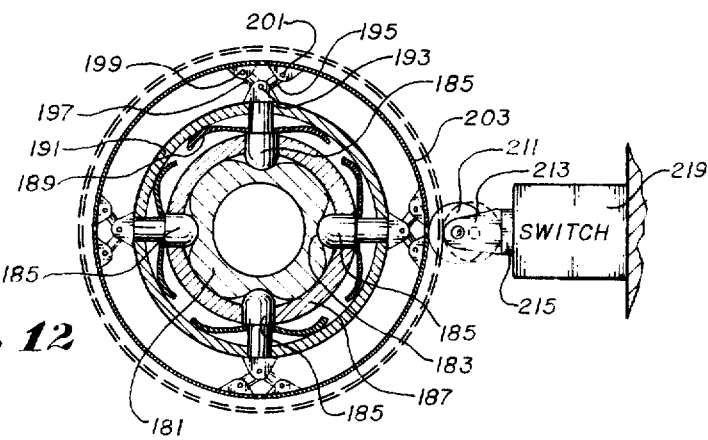
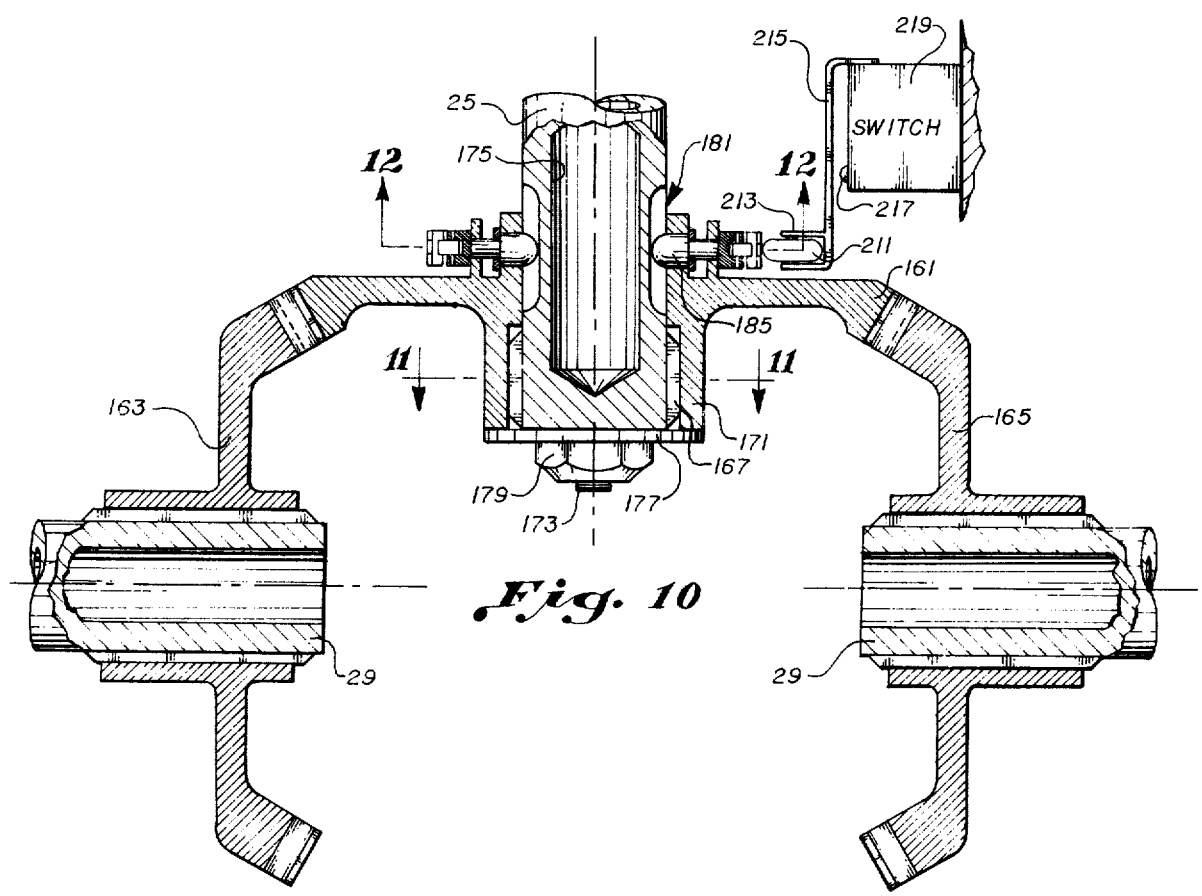
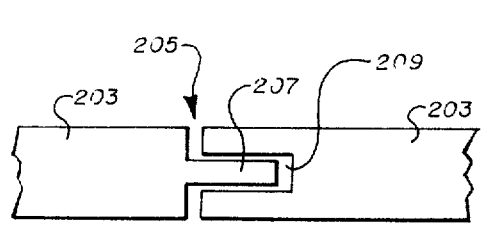
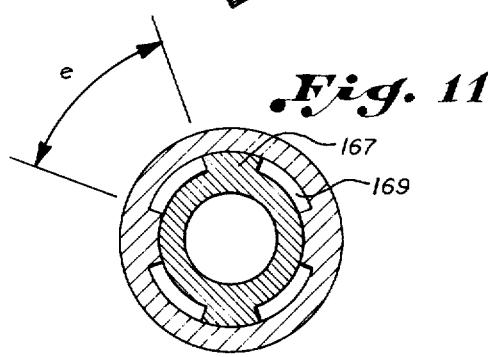

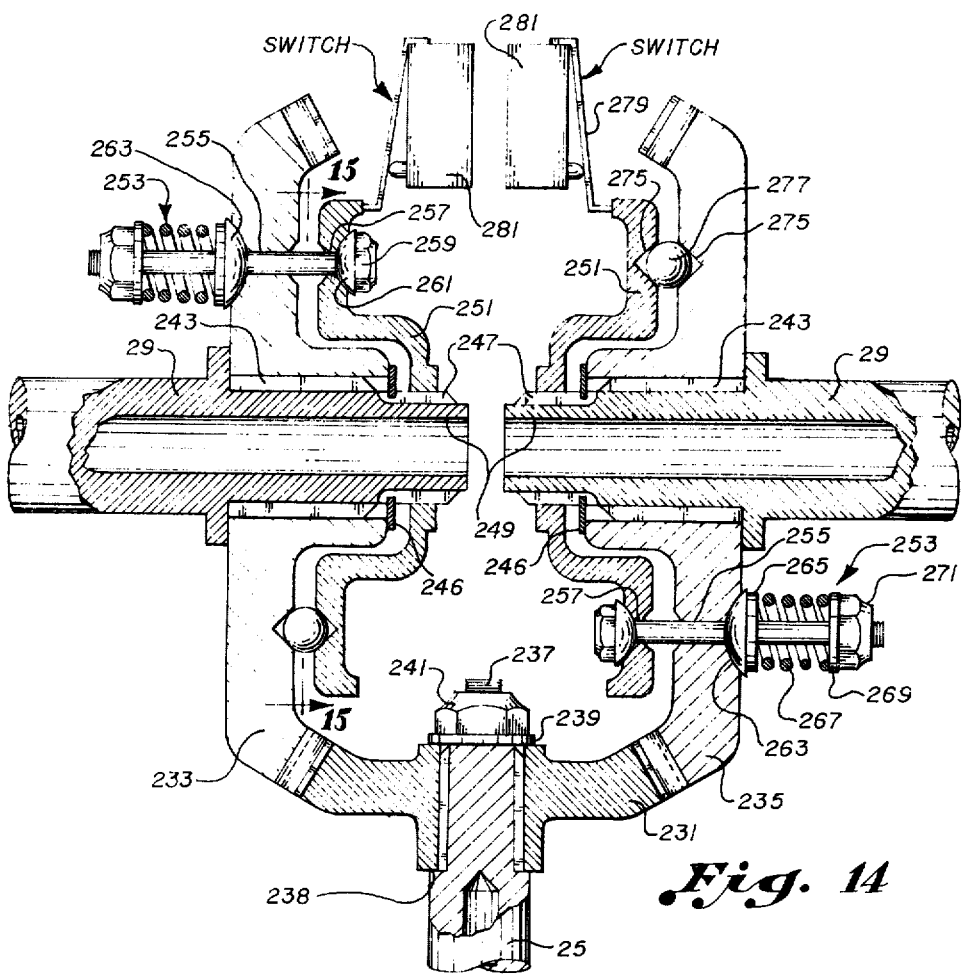
*Fig. 14*
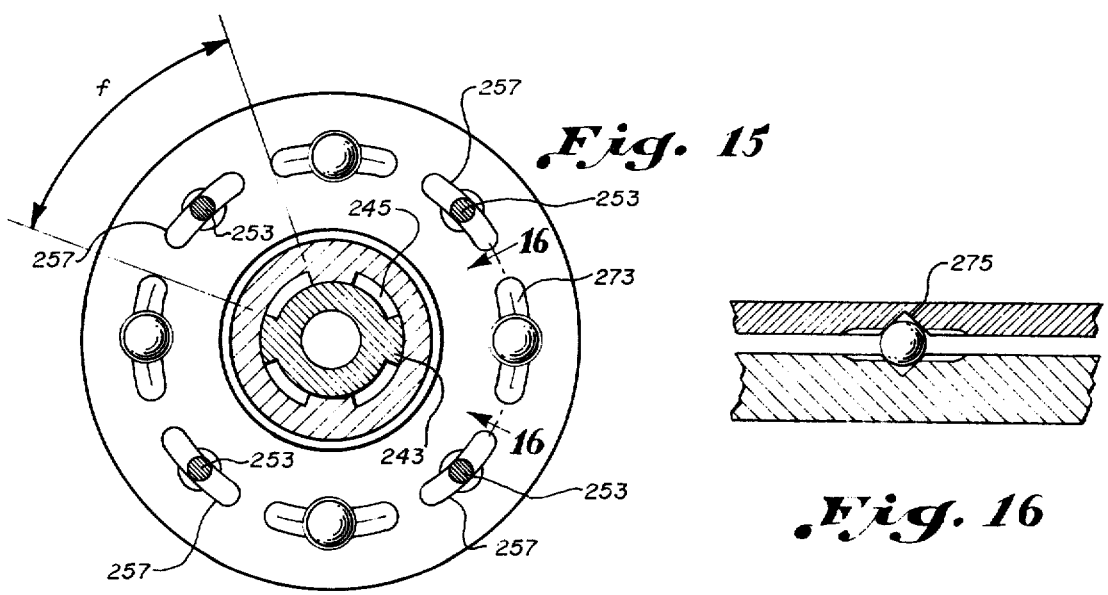
*Fig. 15*
*Fig. 16*

FAILURE DETECTOR AND INDICATOR FOR AIRCRAFT FLAP ACTUATION SYSTEM

BACKGROUND OF THE INVENTION

This invention relates to aircraft flap actuation and, more particularly, to the failure of the primary drive train of an aircraft flap actuator having both primary and secondary drive trains.

In order to be assured of satisfactory flap actuation, many aircraft include both primary and secondary drive trains. The drive trains are driven by a common power source such that a "loop" is created. Normally power to move the flaps of the aircraft between extended and retracted positions is provided via the primary drive train and the secondary drive train, even though being driven, is in an idle state i.e., it applies no operative power to the flap actuators. Upon failure of the primary drive train, the secondary drive train becomes operative and compensates for the failure of the primary drive train. That is, the secondary drive train immediately applies power to the flap actuators to compensate for primary drive train failure. In this manner, flap actuation is not lost when the primary drive train fails.

One of the problems with prior art flap actuators of the foregoing nature, is their failure to provide an indication of primary drive train failure. Thus, loss of the primary drive train is not immediately known to the pilot, and/or aircraft maintenance personnel. This invention is directed to providing a failure detector and indicator apparatus which overcomes this problem.

Therefore, it is an object of this invention to provide a failure detector and indicator for an aircraft flap actuator system.

It is a further object of this invention to provide a failure detector and indicator for detecting and indicating the failure of the primary drive train of an aircraft flap actuator system which includes primary and secondary drive trains.

It is a still further object of this invention to provide a failure detector and indicator for an aircraft flap actuator system having primary and secondary drive trains that provides an immediate indication of the failure of the primary drive train.

SUMMARY OF THE INVENTION

In accordance with principles of this invention a method of and an apparatus for detecting and indicating the failure of the primary drive train of a flap actuator system that includes primary and secondary drive trains is provided. The method generally comprises the steps of: forming a free motion zone in the coupling system coupling the power supply to the secondary drive train; sensing when the free motion zone is crossed, which condition occurs when the primary drive train fails; and, providing an indication that the free motion zone has been crossed. The apparatus of the invention generally includes a coupling system forming part of the secondary drive train, the coupling system including a free motion zone which is crossed when the primary drive train fails. In addition, the apparatus includes an electro-mechanical sensor operatively connected to the coupling system so as to detect when the free motion zone is crossed.

In accordance with further principles of this invention, the electro-mechanical sensor comprises an arm, plunger, or other displaceable means whose position is changed when the free motion zone is crossed. The change in position of the displaceable means causes an electrical signal to be generated or modified. The electrical signal controls a visual or audio indicator which in turn provides an indication of the failure of the primary drive train.

In accordance with still further principles of this invention, the electrical signal is generated or modified by a switch opening (or closing), said switch opening (or closing) being created by the movement of the displaceable means.

It will be appreciated from the foregoing brief summary that the invention provides an uncomplicated method of and apparatus for detecting and indicating the failure of the primary drive train of a flap actuator system that includes primary and secondary drive trains. The apparatus preferably includes an electrical switch whose position change provides a visual or audio indication of the failure of the primary drive train. Because of the inclusion of a free zone, system backlash and the like is prevented from providing a false indication. More specifically, normally, both the primary and secondary drive trains are driven by the same power source in a loop arrangement. In normal operation, the primary drive train powers a plurality of flap actuators and the secondary drive train, while powered, is idle with regard to the application of power to the flap actuators. The secondary drive train is idle because it is driven from both ends of the loop—at one end by the power source, and at the other end by the primary drive train. Failure of the primary drive train removes the driving power provided by the primary drive train. When this event occurs, the secondary drive train ends its idle state and supplies power to the flap actuators. In accordance with the invention, upon termination of the idle state, a free motion zone is crossed to provide an indication of primary drive train failure. The free motion zone by its very nature prevents coupling backlash and the like from causing false failure indications.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 4 is a cross-sectional view illustrating a second preferred embodiment of the invention;

FIG. 5 is a cross-sectional view along line 5—5 of FIG. 4;

FIG. 6 is a cross-sectional view along line 6—6 of FIG. 4;

FIG. 10 is a cross-sectional view of a fourth preferred embodiment of the invention;

FIG. 11 is a cross-sectional view along 11—11 of FIG. 10;

FIG. 12 is cross-sectional view along 12—12 of FIG. 10;

FIG. 13 is a fragmentary view of a portion of the fourth preferred embodiment of the invention illustrated in FIG. 10;

FIG. 14 is a cross-sectional view of a fifth preferred embodiment of the invention;

FIG. 15 is a cross-sectional view along line 15—15 of FIG. 14; and,

FIG. 16 is a fragmentary view along line 16—16 of FIG. 15.

DESCRIPTION OF THE PREFERRED EMBODIMENTS

Figure 1:
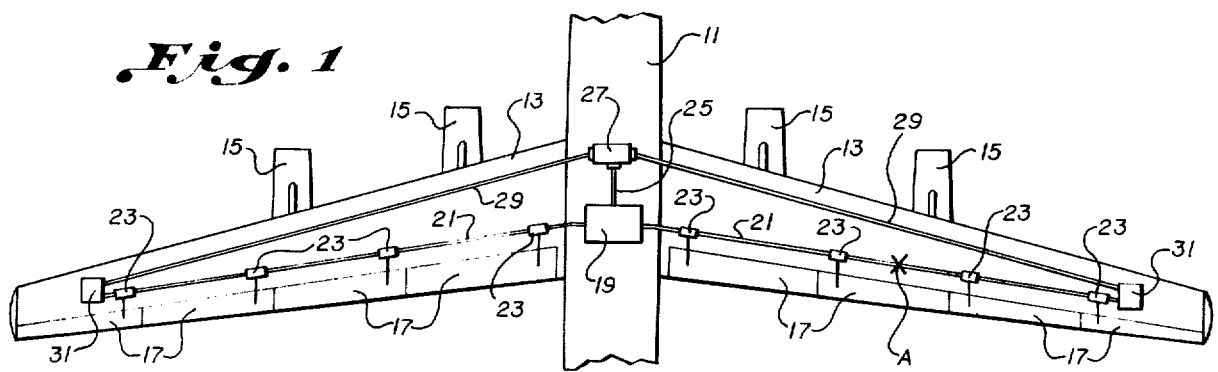
FIG. 1 is a schematic view illustrating an aircraft flap actuator system that includes primary and secondary drive trains.

FIG. 1 is a schematic view illustrating an aircraft flap actuator system which includes primary and secondary drive trains. More specifically, FIG. 1 illustrates a fragmentary portion of an aircraft fuselage 11 and the aircraft's wings 13. Suspended from the wings, for example, are a plurality of jet engines 15. Located along the rear edge of the wings 13 are a pluarlity of flaps 17. A primary control unit 19 is connected via a primary drive train formed of a pair of primary torque tubes 21 to a plurality of flap actuators 23, one associated with each flap 17. That is, a primary torque tube 21 extends outwardly into either wing. As used herein, the term torque tube refers to torque tubes, drive shafts and like elements for transferring rotational power.

Each primary torque tube is connected to a plurality of flap actuators, as is well known in the art. In addition, the primary control unit through a main secondary torque tube 25 and a coupling unit (gear box) 27 drives a pair of wing secondary torque tubes 29 forming a secondary drive train. More specifically, a wing secondary torque tube extends outwardly into either wing. Both wing secondary torque tubes are coupled to the primary control unit (power supply) via a coupling unit 27 and a main secondary torque tube 25. The remote ends of the related wing secondary torque tubes 29 and the primary torque tubes 21 are coupled together via cross coupling units (gear boxes) 31.

In the foregoing manner drive loops are created whereby the flap actuators 23 can be driven by either the primary drive train or the secondary drive train. The gearing of the various coupling units is such that the transmission of power through either set of torque tubes (primary or secondary) will create the same direction actuator force for a particular directional output of the primary control unit. More specifically, when it is desired to apply power to the flap actuators, both the primary and secondary drive trains are driven by the primary control unit 19 so as to generate actuator power in the same direction. Unless and until a failure occurs the primary drive train creates the actual driving power, the secondary drive train in essence being idle, although being driven. Should a primary torque tube fail, such as at point A illustrated in FIG. 1, its associated wing secondary torque tube 29 through its associated cross-coupling unit 31 will compensate for the failure and apply power to the flap actuators located beyond the failure i.e., to the two rightmost flap actuators illustrated in FIG. 1. This action occurs automatically in response to the failure at point A. Failures at other points in the primary drive train will cause corresponding actions on the part of the secondary drive trains.

It will be appreciated from the foregoing description that, normally, the wing secondary torque tubes 29 are idle. That is, they are, in essence, driven at both ends by the primary control unit 19. More specifically, the main secondary torque tube 25 and the coupling unit 27 drive the wing secondary torque tubes at one end. The other ends of the wing secondary torque tubes 29 are driven by the primary control unit 19 via the primary torque tubes and the cross-coupling units 31. Thus, until a failure occurs, the wing secondary torque tubes are idle from a driving point of view i.e., they apply no driving power to the flap actuators. The invention takes advantage of this loop arrangement by including one or more free motion zones in the secondary drive train and detecting and indicating when one or both of the free motion zones is crossed. It will be appreciated that because of the idle state of the secondary drive train, the free motion zones will only be crossed when the primary drive train fails. Thus, the method of the invention generally comprises the steps of: creating a free motion zone in the secondary drive train; sensing when the free motion zone has been crossed; and, providing an indication that the free motion zone has been crossed. The apparatus of the invention is directed to carrying out the method of the invention. Five preferred embodiments of apparatus formed in accordance with the invention are hereinafter described. However, it is to be understood that other apparatus can be formed in accordance with the teachings of the invention. Hence, the invention is not to be construed as limited to these embodiments.

Figure 2:
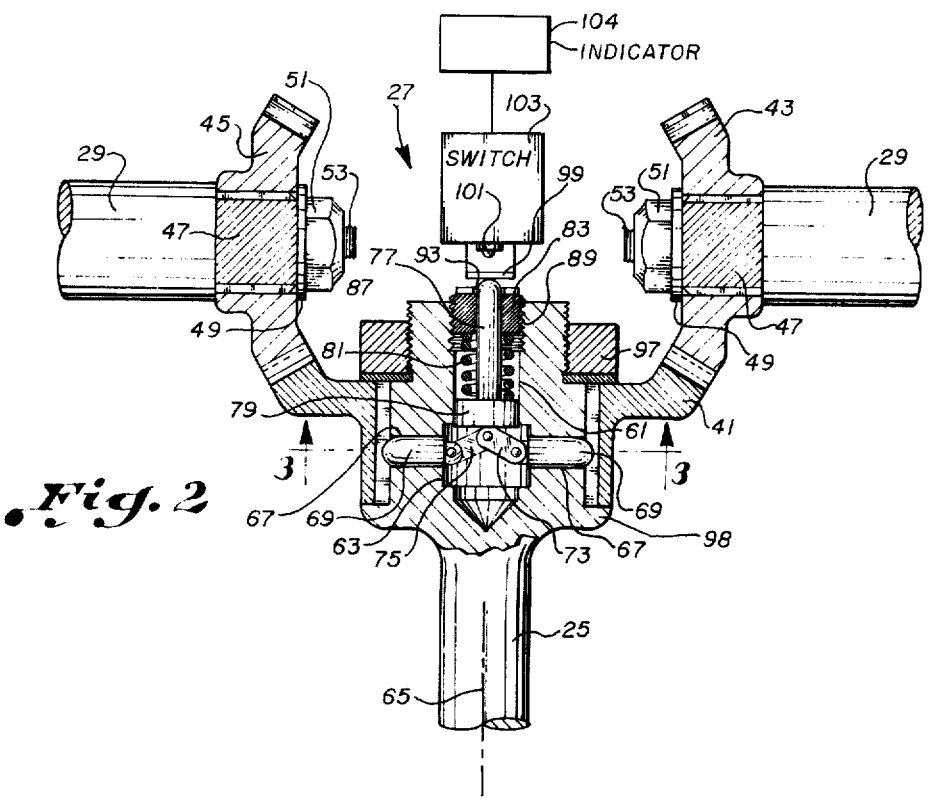
FIG. 2 is a cross-sectional view illustrating a first preferred embodiment of the invention.

FIG. 2 is a cross-sectional view of a first preferred embodiment of the invention and includes: a coupling unit 27, modified in accordance with the invention; the associated end of the main secondary torque tube 25; and, the associated ends of the wing secondary torque tubes 29. The coupling unit 27 includes a main bevel gear 41 and two secondary bevel gears mounted so that the main bevel gear drives the secondary bevel gears 43 and 45. The main bevel gear 41 is affixed to the associated end of the main secondary torque tube 25 in the manner hereinafter described. The two secondary bevel gears 43 and 45 mesh with the main bevel gear 41 and are affixed, on a one-to-one basis, to the associated ends of the wing secondary torque tubes 29. More specifically splines are formed in an undercut region 47 located at the ends of the wing secondary torque tubes 29. The secondary bevel gears 43 and 45 include suitable spline apertures into which the splines fit in a non-rotatable manner. Axial washers 49 and nuts 51, threaded onto coaxial threaded ends 53 formed in the tips of the wing secondary torque tubes, press the bevel gears against the shoulders formed by the undercut regions 47 to prevent axial movement of the bevel gears 43 and 45.

Figure 3:
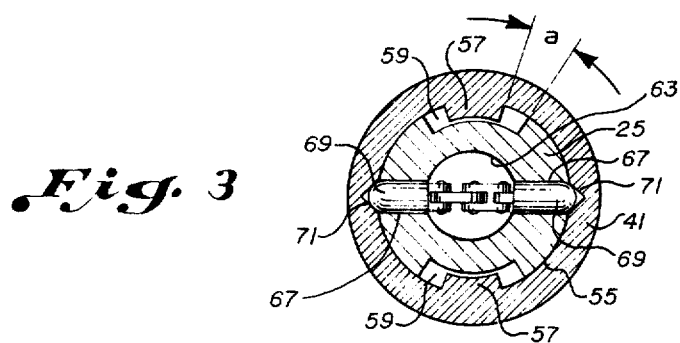
FIG. 3 is a cross-sectional view along line 3—3 of FIG. 2.

The main bevel gear 41 is affixed to the main secondary torque tube 25 in a manner that creates a free motion zone. More specifically, as illustrated in FIG. 3, the main bevel gear 41 includes a cylindrical central aperture 55 having two inwardly projecting integral keys 57. The keys 57 are arrayed in keyways 59 formed in the end of the main secondary torque tube 25. The keys 57 are substantially narrower in width than are the keyways 59 whereby a free motion zone, defined by the angle a, is formed on either side of the keys 57 when the keys are centered in the keyways. As will be better understood from the following description, this centering condition exists when the primary drive train is operating without failure.

A longitudinal cylindrical aperture 61 is formed in the end of the main secondary torque tube 25. Located near the inner end of the longitudinal cylindrical aperture 61 is a slightly larger cylindrical aperture 63. The slightly larger cylindrical aperture 63 is generally aligned, longitudinally, with the keys 57 and keyways 59. A pair of aligned, transverse cylindrical apertures 67 intersect the slightly larger cylindrical aperture 63. Each transverse cylindrical aperture 67 houses a pin 69 having a semispherical outer tip. The pins 69 project outwardly so that their tips lie in longitudinal V-shaped apertures 71 formed in the cylindrical central aperture 55 of the main bevel gear 41. The pins and V-shaped apertures 71 also lie along an axis that is generally orthogonal to the axis defined by the keys 57 and keyways 59, as viewed in FIG. 3.

The inner ends of the pins 71 are connected together by two links 73 and 75. The links 73 and 75 are rotatably pinned together on one end, and each to one of the pins 69 at their other ends. The links 73 and 75 are formed so as to articulate upwardly and press against the enlarged head 79 of an actuator shaft 77, when the pins are mounted in their respective transverse cylindrical apertures so as to lie in their associated V-shaped apertures. That is, the junction point between the pins 73 and 75 is adapted to press against the enlarged head 79 of the actuator shaft 77 when the link pin assembly is formed and mounted in the manner described above. Mounted about the actuator shaft 77, above its enlarged head 79 (as viewed in FIG. 2), is a coil spring 81. The upper end of the coil spring presses against a threaded collar 83 mounted in a cylindrical aperture 89 coaxial with and slightly larger than the longitudinal central aperture 61. Thus, the threaded collar 83 surrounds the actuator shaft 77 and is screwed into the end of the main secondary torque tube. A threaded ring 97 is screwed onto the outer periphery of the end of the main secondary torque tube 25. The lower surface of the threaded ring 97 coacts with a flange 98 to prevent longitudinal movement of the main bevel gear 41.

The upper end of the actuator shaft 77 impinges on a downwardly projecting springloaded actuator element 99. The spring loaded actuator element 99 is aligned with a switch terminal, or actuator, 101 that forms a portion of a micro switch 103. The alignment is such that when the actuator shaft 77 is moved upwardly as viewed in FIG. 2, it moves the actuator element 99 upwardly which action causes the micro switch 103 to change states—from open to closed or vice versa. The invention can be formed such that the actuator element 99 and the actuator 101 form a pair of switch contacts, or such that the actuator element mechanically moves to cause a switching action through switch elements not illustrated.

Turning now to a description of the operation of the embodiment of the invention illustrated in FIGS. 2 and 3; normally, the outer tips of the pins 69 lie in the V-shaped apertures 71 as illustrated in FIG. 3. Under this condition, the free motion zone, defined by the angle a, exists between the keys 57 and the keyways 59. As discussed above, when the primary drive train fails for one reason or another, power is applied through the secondary drive train to flap actuators located beyond the point of failure. Thus, one of the wing secondary torque tubes 29 becomes loaded at its outer end. This loading causes the main secondary torque tube shaft 25 to move with respect to the main bevel gear 41 through the free motion zone. The direction of relative movement, of course, depends upon the direction of rotary motion existing when failure occurs. In any event, when such relative movement occurs, the pins 69 are forced inwardly. The inward movement of the pins 69 causes the links 73 and 75 to articulate further upwardly against the force provided by the coil spring 81. The further upward articulation of the link drives the actuator shaft 77 upwardly into contect with the actuator 99 to cause actuation of the micro switch 103. The change in switch state created by this action is used to control a suitable indicator 104 connected to the switch 103. The indicator, thus, provides an indication of primary drive train failure. The indicator can be visual or audio, as desired.

FIGS. 4, 5, and 6 illustrate an alternative embodiment of the invention which comprises a worm gear 101, driven by the main secondary torque tube 25 (not illustrated), and a worm wheel 103 driven by the worm gear. The worm wheel 103 rotates about a central longitudinal axis 105 coaxial with axis of rotation of the wing secondary torque tubes 29, and is affixed thereto in a "free motion zone" manner. More specifically, the worm wheel 103 includes threaded collars 107 which project outwardly from either side, about its axis of rotation. Coaxial with the axis of rotation of the worm wheel 103, and passing through the worm wheel and the threaded collars 107, is a central aperture 109.

The ends of the wing secondary torque tubes 29 are mounted in the central aperture 109 in a manner such that a free motion zone having a distance of movement, defined by an angle designated b (FIG. 5), is created. More specifically, as illustrated in FIG. 5, the cross-sectional configuration of the central aperture 109 is such that it includes a pair of opposed keyways 111 within which lie keys 113 formed as in integral part of the ends of the wing secondary torque tubes 29. The arcuate width of keyways 111 is substantially greater than is the arcuate width of the keys 113. The free motion zone angle b is equal to one-half the difference between these arcuate widths.

Mounted on the threaded collars 107 of the worm wheel 103 are indicator control nuts 115. Formed in the peripheral outer ends 117 of the indicator control nuts 115 are spaced flanges 121. The flanges 121 define a peripheral cylindrical aperture 119. In addition, the outer ends of the indicator control nuts are formed such that they include central apertures which allow them to be spline connected to their associated wing secondary torque tubes 29. The spline connection is formed in a manner such that relative rotational motion between the indicator control nuts and the secondary torque tubes is prevented (FIG. 6) while longitudinal movement therebetween is not prevented.

Mounted in each peripheral cylindrical aperture 119 defined by the spaced flanges 121 of the indicator control nuts 115 is a switch trigger element 120. The switch trigger elements 120 are connected by arms 123 to switches 125. As illustrated in the FIGURES, the arms 123 can be moved either to the right or to the left.

Turning now to a description of the operation of the embodiment of the invention illustrated in FIGS. 4–6; normally, as described above, the wing secondary torque tubes 29 are idle i.e., they are driven when the flaps are extended or retracted but do not apply power to the flap retractors. Thus, the keys 113 lie generally in the center of the keyways 111. When the primary drive train fails, the secondary drive train is required to power flap actuators located beyond the failure point. This requirement causes the free motion zone to be crossed in one direction or the other (depending upon whether the flaps are being extended or retracted when the failure occurs). Crossing of the free motion zone causes one of the indicator control nuts 115 to move either outwardly or inwardly along its associated secondary torque tube 21. This movement causes one or the other of the flanges 121 forming a portion of the thusly moved nut to impinge on the related switch trigger element 120 and move its attached arm 123. This action changes the state of the associated switch 125 causing an indication to be provided. The indication may be audio or visual and indicates that a failure of a primary drive train has occurred. Be selectively sensing the state of the two swtiches 125, the side of the aircraft on which the failure occurred is readily determined.

Figure 7:
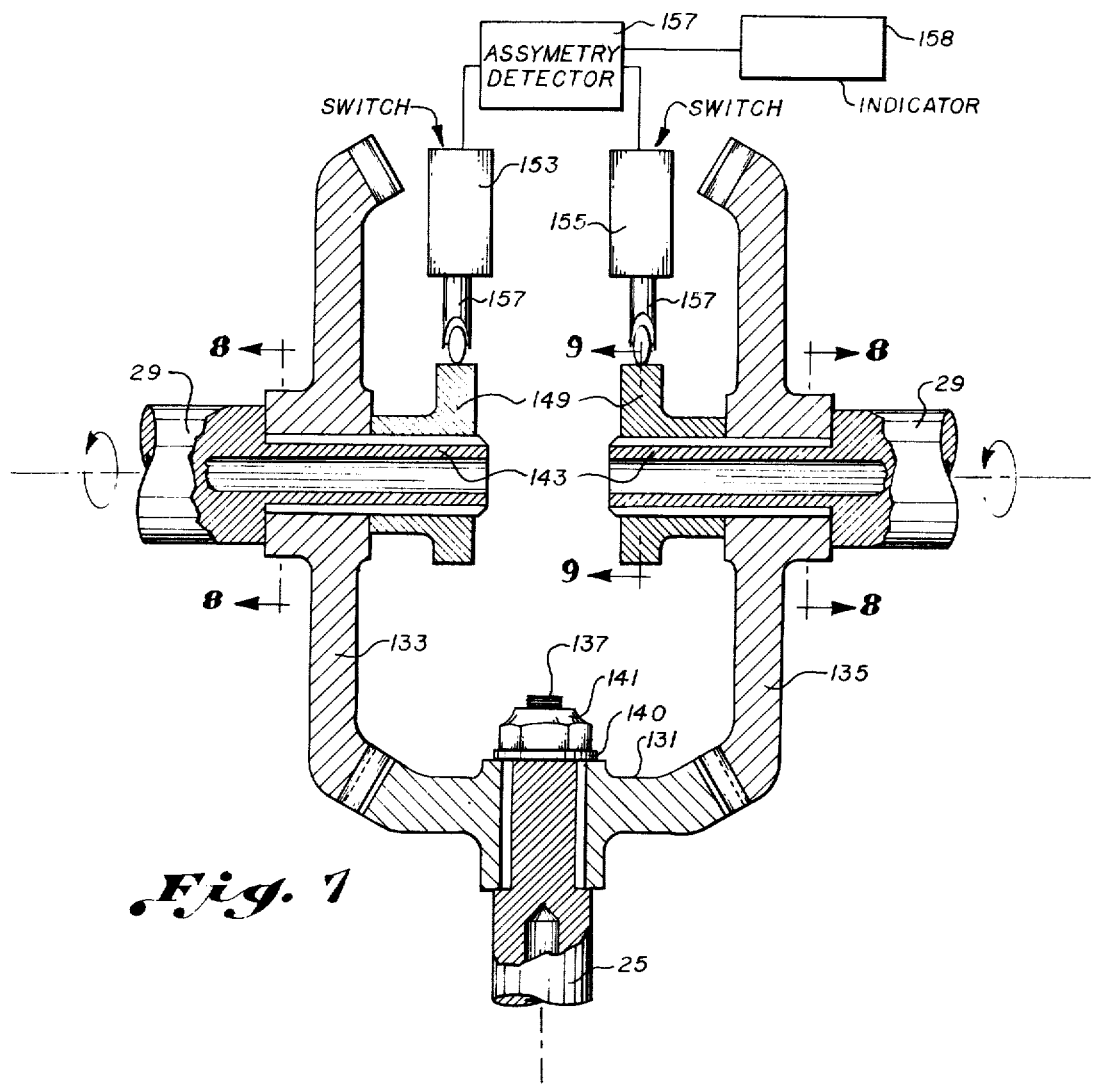
FIG. 7 is a cross-sectional view of a third preferred embodiment of the invention.
Figure 9:
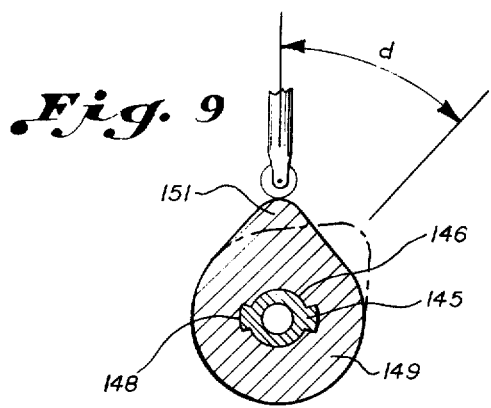
FIG. 9 is a cross-sectional view along line 9—9 of FIG. 7.
Figure 8:
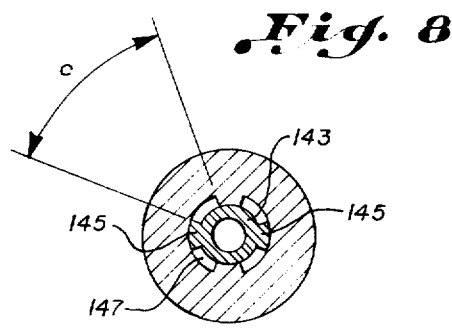
FIG. 8 is a cross-sectional view along line 8—8 of FIG. 7.

FIGS. 7-9 illustrate another alternative embodiment of the invention wherein power is transferred from the main secondary torque tube 25 to the wing secondary torque tubes 29 via a bevel gear coupling mechanism. A main bevel gear 131 is spline connected in a non-rotatable manner to the main secondary torque tube 25. A threaded stud 137 projects outwardly from the main secondary torque tube 25, and forms part of it. A washer 140 and a nut 141 are affixed to the outer threaded end of the stud such that the washer and nut prevent the longitudinal movement of the bevel gear 131.

The main bevel gear 131 meashes with second and third bevel gears 133 and 135. The second and third bevel gear 133 and 135 are attached on a one-to-one basis, to the ends of the wing secondary torque tubes 29 in a free motion zone manner. More specifically, as illustrated in FIG. 8, the tips of the wing secondary torque tubes 29 include integral keys 145 formed in an undercut region 143. The integral keys 145 lie in keyways 147 formed in central apertures located along the axis of rotation of the second and third bevel gear 133 and 135. The arcuate width of the keys is substantially less than is the arcuate width of the keyways 147 whereby a free motion zone, defined by the angle c (FIG. 8), is formed on either side of the keys 145 when they are centered in the keyways 147.

The key ends 143 of the wing secondary torque tubes 29 are substantially wider than the thickness of the second and third bevel gears 133 and 135. Tightly affixed to the tips of the wing secondary torque tubes are single lobe cams 149. More specifically, as illustrated in FIG. 9, the single lobe cams include central apertures 146. The central apertures include keyways 148 equal in arcuate width to the width of the keys 145 formed in the tips of the wing secondary torque tubes 29. Thus, the single lobe cams 149 are affixed to the tips of the wing secondary torque tubes in a non-rotatable manner.

As illustrated in FIG. 9, the single lobe cams 149 include single lobes 151. Normally, these lobes are aligned. However, as will be better understood from the following description, when a primary torque tube failure occurs, the lobes become misaligned whereby one achieves the solid position illustrated in FIG. 9 and the other achieves the dotted position. The arcuate misalignment is defined by an angle designated d.

The embodiment of the invention illustrated in FIGS. 7-9 includes two switches 153 and 155. Each switch includes a cam follower 157 which is adapted to move upwardly and downwardly as viewed in FIG. 7 as the single lobe cams 149 are rotated. Each time a lobe 151 impinges on one of the cam followers 157, it moves that cam follower upwardly. This action changes the state of its associated switch 153 and causes a pulse to be generated. The thusly generated pulses are applied to an asymetry detector 157.

Turning now to a description of the operation of the embodiment of the invention illustrated in FIGS. 7-9; normally, both wing secondary torque tubes 29 are idle i.e., regardless of whether they are rotating or non-rotating they are not applying power to any flap actuators. Thus, the keys 145 are aligned in the keyways 147 and the cam lobes 151 are aligned. Because the cam lobes are aligned, the switches 153 and 155 generate synchronous pulses. When the primary drive train fails, one of the wing secondary torque tubes 29 crosses an associated free motion zone c, as power is transferred from the main secondary torque tube 25 to the wing secondary torque tube 29 related to the failure location. Crossing of one of the free motion zones creates a cam lobe misalignment. Thus, the pulses generated by the switches 153 and 155 become asynchronous. This condition is sensed by the asymmetry detector 157 which in turn causes a suitable indication to be created on an indicator 158 connected to the asymmetry detector. As will be appreciated by those skilled in the art and others, the asymmetry detector can be designed such that it will perform a discrimination function i.e., it will determine which of the wing flap control systems has failed, by sensing the leading/lagging nature of the received pulses. Thus, not only is a failure indication provided, but an indication of the location of the failure is also provided by the invention.

FIGS. 10-13 illustrate a further alternative embodiment of the invention wherein power is also transferred via a bevel gear coupling mechanism. The main bevel gear 161 is attached to the main secondary torque tube 25 in a free motion zone manner as hereinafter described. Second and third bevel gears 163 and 165 are tightly splined in a non-relative rotational manner to the ends of the wing secondary torque tubes 29 about their axes of rotation. The main bevel gear meshes with the second and third bevel gears in a conventional manner.

As best illustrated in FIG. 11, the main secondary torque tube 25 includes keys 167 located near its tip. The keys 167 lie in keyways 169 formed in a central aperture located in a collar 171. The collar 171 forms an integral part of the main bevel gear 161. The arcuate width of the keys 167 is substantially less than is the arcuate width of the keyways 169 whereby a free motion zone, defined by the angle e, is formed on either side of the keys 167 when they are centered in the keyways 169. Longitutinal movement of the main bevel gear 161 with respect to the main secondary torque tube 25 is prevented by a stud 173, which projects outwardly, and a washer 177 and a nut 179. The nut 179 is mounted on the stud 173 and presses the washer 177 against the collar 171.

Located above the keyed end of the main secondary torque tube 25, as viewed in FIG. 10, is a region 181 which appears to be in the shape of a "four leaf" clover (FIG. 12), when viewed in cross-section. Thus, four equal spaced indentations 183 exist in this region. Lying in each indentation 183 is the tip of a pin 185. The pins extend outwardly along two orthogonal axes through an inner collar 187. The inner collar 187 is integral with the main bevel gear 161 and located in the opposite side of the gear from keyway collar 171. The pins 185 are undercut where they emerge from the inner collar 187, when the pin tips lie in the indentations 183. Thus, each pin includes a shoulder. The center of a leaf spring 189 impinges on each such shoulder. The outer tips of the leaf springs 189 press against an outer collar 191 coaxial with and spaced from the inner collar 187. Thus, the leaf springs are adapted to press the pin tips into the indentations 183.

Affixed to, or integrally formed with, the outer ends of the pins 185 are a pair of spaced flanges 193. The spaced flanges rest against the outer surface of the outer collar 191 when the tips of the pins lie in the indentations 183, and are each pinned by pins 193 to two outwardly diverging arms 195 and 197. The arms in turn are pinned by pins 201 to flanges 199 attached to the elements of a four element split ring 203. Each of the elements of the split ring join their associated elements via a male/female junction 205 as seen in FIG. 13. The junctions lie between the diverging arms 195 and 197. When the pin tips lie in the indentations 183, the male portions 207 of the split rings lie entirely within the female portions 209. This is the solid line state of the split ring illustrated in FIG. 12. Pressing against the split ring 203 is a roller 211 which is connected by a flange 213 to an arm 215 adapted to coact with a switch contact or actuator 217 forming part of a switch 219.

Turning now to a description of the operation of the embodiment of the invention illustrated in FIGS. 10–13; when the wing secondary torque tubes are not adapted to deliver power to the flap actuators (i.e., no failure exists), the pins 185 lie in the indentations 183, the split ring is collapsed (solid line position-FIG. 12) and the roller 211 is in its outer position (solid line-FIG. 12). When a primary drive train failure occurs, a free motion zone defined by the angle e is crossed. This action causes section 181 (the four leaf clover section) to rotate with respect to the main bevel gear 161. This relative rotation forces the pins 185 outwardly against the force of the leaf springs. The outward movement of the pins 185 moves the split ring 203 outwardly i.e., to the dotted line position illustrated in FIG. 12. The split ring movement, in turn, moves the roller 211 to its dotted line position, also illustrated in FIG. 12. Movement of the roller moves the arm 215 against the switch contact or actuator 217 thereby changing the state of the switch 219. The switch 219 state change in turn, controls an indication which provides an indication of the failure of the primary drive train.

FIGS. 14–16 illustrate a final embodiment of the invention wherein power, is also transferred via a bevel gear coupling unit. A main bevel gear 231 is non-rotatably affixed, via keys and keyways, to the main secondary torque tube 25. Longitudinal motion between the main bevel gear 231 and the main secondary torque tube is prevented by an end locking arrangement comprising a stud 237, a flat washer 239 and a nut 241. The stud is part of, and extend outwardly from, the end of main secondary torque tube 25. The washer and nut are mounted on the outer end of the stud and press the main bevel gear 231 against a shoulder 238 formed where the keys end.

The wing secondary torque tubes 29 are keyed in a free motion zone manner to second and third bevel gears 233 and 235, as illustrated in FIG. 15. That is, keys 243 are formed near the ends of the secondary torque tubes 29. The keys 243 lie in keyways 245 formed in a central aperture located about the axis of rotation of the second and third bevel gears 233 and 235. Longitudinal movement of the second and third bevel gears 233 and 235 is prevented by lock rings 246 which coact with flanges 248 formed in the secondary torque tubes 29 in the region where the keys 243 start to form. As with the previously described embodiments of the invention, the arcuate width of the keys 243 is substantially less than is the arcuate width of the keyways 245 whereby a free motion zone, defined by an angle f, is created on either side of the keys 243.

A small set of keys 247 are formed in an undercut region 249 located in the outer tips of the secondary torque tubes 29. The small keys 247 lie in keyways formed in flange plates 251. The connection is such that the flange plates are prevented from rotating with respect to the secondary torque tubes. The flange plates are formed and located such that they face the second and third bevel gears 233 and 235 in a one-to-one relationship.

The flange plates 251 are connected to their associated bevel gears 233 and 235 in a manner which allows a slight rotational movement therebetween to occur when the free motion zone defined by the angle f is crossed. More specifically, a plurality of springloaded bolts 253, illustrated as four in number, pass through each flange/bevel gear combination. The springloaded bolts pass through circular holes 255 in the bevel gears and arcuate slots 257 in the flange plates 251. The slots 257 are best illustrated in FIG. 15.

The springloaded bolts 253 include heads 259 and semi-spherical washers 261 which lie in semi-spherical apertures formed in the outer sides of the flange plates 251. In addition, semi-spherical washers 263 lie in semi-spherical apertures formed in the outer surfaces of the second and third bevel gears 233 and 235. Moving outwardly from the bevel gear semi-spherical washers 263, along the length of the springloaded bolts, are found first flat washers 265, coil springs 267, second flat washers 269 and nuts 271. The compression of the coil springs 267, obviously, provides a force which tends to press the flange plates 251 toward their associated bevel gears 233 and 235.

Located intermediate the springloaded bolts 253 are further arcuate slots 273. The further arcuate slots 273 include center V-shaped regions 275 and are formed in both the bevel gears 233 and 235 and their associated flange plates 251, in spaced aligned (facing) relationship. Located in the further arcuate slots, normally in the center V-shaped regions, are ball bearings 277. That is, under normal operation (no failure of the primary drive train), the ball bearings are centered in the further arcuate slots.

Upon failure of the primary drive train, flap actuator power is transferred from the main secondary torque tube 25, through the bevel gear coupling to the wing secondary torque tube 29 related to the failure. This transfer of power causes the associated second or third bevel gears to cross its associated free motion zone and cause a misalignment between the second or third bevel gear and its associated flange plate 251. This misalignment causes the ball bearings 275 to move out of one or both of the V-shaped slots of their related further arcuate slots and move the associated flange plate 251 and bevel gear apart against the force created by the coil springs 267. When this movement occurs, the associated flange plate 251, in turn, moves an arm 279 associated with one of two switches 281. Movement of the arm causes the switch state to change (from closed to open or vice versa). Change of the state of the associated switch results in the creation of an indication that the primary drive train has failed.

It will be appreciated from the foregoing description that the invention provides an uncomplicated method of and apparatus for detecting and indicating the failure of the primary drive train of a flap actuation system that includes primary and secondary drive trains. In general, when the primary drive train fails, a free motion zone is crossed. This crossing action is sensed and the data sensed is used to create an indication. Thus, the indication is related to primary drive train failure. In addition, the data sensed can include location information i.e., whether or not the failure occurred in the right or left wing.

While preferred embodiments of the invention have been illustrated and described, it will be appreciated by those skilled in the art and others that various changes can be made therein without departing from the spirit and scope of the invention. For example, while the keys have been illustrated and described as forming an integral part of their associated component, they could be separate items, if desired, as is well known to those skilled in the art. Moreover, various other devices and apparatus, other than that described, can be used to attach the various gears to their associated torque tubes. Hence, the invention can be practiced otherwise than as specifically described herein.

The embodiments of the invention in which an exclusive property or privilege is claimed are defined as follows:

1. A method of detecting and indicating the failure of the primary drive train of an actuator system that includes a primary and a secondary drive train, said secondary drive train adapted to shift from a non-driving state to a driving state upon failure of the primary drive train, said method comprising the steps of:
   forming a free motion zone in said secondary drive train;
   sensing when the free motion zone is crossed; and,
   providing an indication that the free motion zone has been crossed.

2. A method of detecting and indicating the failure of the primary drive train of an aircraft flap actuator system that includes a power driven primary drive train for applying power to the flap actuators associated with each of the two wings of the airplane and a power driven secondary drive train for applying power to the flap actuators associated with each of the two wings of the aircraft upon failure of the primary drive train, said method comprising the steps of:
   forming a free motion zone in the coupling system coupling the power supply to the secondary drive train;
   sensing when the free motion zone is crossed, which condition occurs when the primary drive train fails; and,
   providing an indication that the free motion zone has been crossed.

3. A method of detecting and indicating the failure of the primary drive train of an aircraft flap actuator system as claimed in claim 2 wherein two free motion zones are formed, one of said free motion zones being associated with one of said two wings of said aircraft and the other being associated with the other of said two wings of said aircraft and wherein the crossing of either of said two free motion zones is sensed.

4. A method of detecting and indicating the failure of the primary drive train of an aircraft flap actuator system as claimed in claim 3 wherein said step of providing an indication of the crossing of either of said two free motion zone includes the substep of providing an indication of which one of said two wings is associated with said failure of said primary drive train.

5. Apparatus for detecting and indicating the failure of the primary drive train of an actuator system that includes a primary and secondary drive train, said secondary drive train including a coupling system for coupling power between a driven torque tube, and at least one secondary torque tube, said apparatus comprising:
   at least one free motion zone formed in said coupling system;
   at least one detecting means for detecting the crossing of said at least one free motion zone; and,
   an indicating means coupled to said at least one detecting means for providing an indication of the crossing of said at least one free motion zone.

6. Apparatus for detecting and indicating the failure of the primary drive train of an actuator system as claimed in claim 5 wherein said free motion zone is formed between said driven torque tube and said coupling system.

7. Apparatus for detecting and indicating the failure of the primary drive train of an actuator system as claimed in claim 5 wherein said coupling system is adapted to couple power between said driven torque tube and two secondary torque tubes, and wherein two free motion zones are formed in said coupling system, one of said free motion zone formed between said coupling unit and one of said two secondary torque tubes and the other of said free motion zones formed between said coupling unit and the other of said two secondary torque tubes.

8. Apparatus for detecting and indicating the failure of the primary drive train of an actuator system as claimed in claim 5 wherein said detecting means comprises a mechanically movable element adapted to change position when said free motion zone is crossed.

9. Apparatus for detecting and indicating the failure of the primary drive train of an actuator system as claimed in claim 5 wherein said indicating means is a switch whose state is changed when said detecting means detects the crossing of said free motion zone.

10. Apparatus for detecting and indicating the failure of the primary drive train of an actuator system as claimed in claim 5 wherein said free motion zone is formed in said coupling system by:
   keys associated with one of: (a) said coupling system and (b) said driven torque tube or said at least one secondary torque tube; and
   keyways associated with the other of: (a) said coupling system; and, (b) said driven torque tube or said at least one secondary torque tube, said keys being mounted in said keyways in a manner such that relative movement can occur between said keys and said keyways.

11. A coupling unit for connecting a drive torque tube to at least one driven torque tube, including means for providing an indication of the application of driving power from said drive torque tube to said at least one driven torque tube, said coupling unit comprising:
   a first gear affixed to the end of said drive torque tube;

a second gear affixed to the end of said at least one driven torque tube and arrayed so as to mesh with said first gear;

a free motion zone formed between one of said first gear and said drive torque tube and said at least one driven torque tube and said second gear;

detecting means mounted so as to detect the crossing of said free motion zone; and, indicating means coupled to said detecting means for providing an indication when said detecting means detects that said free motion zone has been crossed.

12. A coupling unit as claimed in claim 11, wherein said free motion zone is formed between said drive torque tube and said first gear.

13. A coupling unit as claimed in claim 12 wherein said free motion zone is formed by keys associated with one of said first gear and said drive torque tube, and keyways associated with the other of said first gear and said drive torque tube, said keys being substantially narrower in arcuate width than said keyways, and lying in said keyways.

14. A coupling unit as claimed in claim 13, wherein said detecting means comprises:

at least one transverse aperture formed in said drive torque tube;

at least one pin lying in said at least one transverse aperture formed in said drive torque tube and projecting outwardly;

an aperture formed in said first gear and positioned such that the outer tip of said pin lies in said aperture when said keys lie substantially in the center of said keyways; and, a coupling mechanism coupled to the inner end of said pin, said coupling mechanism adapted to move when said pin is moved out of said aperture in said first gear, said movement occurring when said free motion zone is crossed.

15. A coupling unit as claimed in claim 14, wherein said indicating means comprises an electrical switch operatively connected to said coupling mechanism so as to be changed in state when said coupling mechanism is moved by said pin moving out of said aperture in said first gear.

16. A coupling unit as claimed in claim 13, wherein said detecting means comprises:

a plurality of indentations formed in the outer periphery of said drive shaft;

a first collar affixed to said first gear so as to surround said plurality of indentations, said collar including a plurality of apertures equal in number to said plurality of indentations and aligned therewith when said keys are centered in said keyways;

a plurality of pins equal in number to said plurality of apertures and lying in said plurality of apertures;

a second collar surrounding said first collar and affixed to said first gear, and including a plurality of apertures equal in number to said plurality of pins and aligned with said apertures in said first collar;

a plurality of springs equal in number to said number of pins and associated therewith on a one-to-one basis, said springs mounted between said pins and said second collar so as to force said pins into said indentations when said keys lie in the center of said keyways; and, a split ring affixed to the outer ends of said pins and movable between an inner position and an outer position, said split ring moved between said inner and said outer positions when the inner tips of said pins are moved from said indentations, said inner tips of said pins moving from said indentations when said free motion zone is crossed.

17. A coupling unit as claimed in claim 16, wherein said indicating means comprises:

a roller adapted to ride on the outer surface of said split ring; and, a switch mechanically connected to said roller so as to sense when said split ring moves from its inner position to its outer position.

18. A coupling unit as claimed in claim 11, wherein said free motion zone is formed between said second gear and said at least one driven torque tube.

19. A coupling unit as claimed in claim 18, wherein said free motion zone is formed by keys associated with one of said at least one driven torque tube and said second gear, and keyways associated with the other of said at least one driven torque tube and said second gear, said keys being substantially narrower in arcuate width than said keyways, and lying in said keyways.

20. A coupling unit as claimed in claim 19, wherein said first gear is a worm gear and wherein said second gear is a worm wheel mounted so as to mesh with said worm gear.

21. A coupling unit as claimed in claim 20, wherein said detecting means comprises:

a boss extending outwardly from said worm wheel about its axis of rotation;

peripheral threads formed on said boss; and a nut threaded onto said peripheral threads and affixed to said at least one driven torque tube so as to be movable longitudinally with respect thereto, but not rotationally, said longitudinal movement occurring when said free motion zone is crossed.

22. A coupling unit as claimed in claim 21, wherein said indicator means comprises a switch including a switch arm, said switch arm mounted so as to be moved by said nut when said nut is moved longitudinally, movement of said switch arm by said nut causing said switch to change states.

23. A coupling unit as claimed in claim 19, wherein said detecting means comprises a cam affixed to said at least one driven torque tube so as to change relative positions when said free motion zone is crossed, and a cam follower operatively connected between said cam and said indicating means.

24. A coupling unit as claimed in claim 18, wherein said coupling unit connects a driving torque tube to first and second driven torque tubes and includes means for providing an indication of the application of driving power from said driving torque tube to either of said driven torque tubes and wherein said second gear is affixed to the end of said first driven torque tube, said coupling unit including a third gear affixed to the end of said second driven torque tube so as to mesh with said first gear, a second free motion zone being formed between said third gear and said second driven torque tube.

25. A coupling system as claimed in claim 18 wherein said first free motion zone is formed by keys associated with one of said first driven torque tubes and said second gear, and keyways associated with the other of said first driven torque tubes and said second gear and said second free motion zone is formed by keys associated with one of said second driven torque tubes and said third gear, and keyways associated with the other of said second driven torque tubes and said third gear, said keys being substantially narrower in arcuate width than said keyways, and lying in said keyways.

26. A coupling unit as claimed in claim 25, including a first cam affixed in a nonrotatable manner to said first driven torque tube so as to be movable in a rotational manner with respect to said second gear when said first free motion zone is crossed and a second cam affixed to said second driven torque tube so as to be moved in a rotational manner with respect to said third gear when said second free motion zone is crossed.

27. A coupling unit as claimed in claim 26, wherein said indicating means comprises:
  first and second switches mechanically connected to said first and second cams, respectively, so as to be in states determined by the rotational positions of said cams; and,
  an asymmetry detector connected to said first and second switches, said cams being oriented such that said first and second switches change states in a symmetrical manner as long as neither of said first and second free motion zones are crossed.

28. A coupling unit as claimed in claim 19 including:
  a flange plate non-rotatably affixed to said at least one driven torque tube so as to be facing said second gear; and,
  pressing means for pressing said flange plate against said second gear in a manner such that said flange plate can rotate with respect to said second gear when said free motion zone is crossed, said rotation causing said flange plate to move away from said second gear against the force created by said pressing means.

29. A coupling system as claimed in claim 28, wherein said indicating means comprises a switch mechanically coupled to said flange plate so as to sense the movement of said flange plate away from said second gear when said free motion zone is crossed, said movement causing said switch to change states.

* * * * *